(No Model.) 3 Sheets—Sheet 2.

A. RAUBER.
BAKE OVEN.

No. 578,833. Patented Mar. 16, 1897.

Attest
Walter Donaldson
Wm. F. Hall

Inventor
Adolph Rauber
by Richards & Co.
Attys.

(No Model.) 3 Sheets—Sheet 3.

A. RAUBER.
BAKE OVEN.

No. 578,833. Patented Mar. 16, 1897.

Witnesses
H. van Oldenneel
E. A. Scott

Inventor
Adolph Rauber
by Richardson
Attorneys

UNITED STATES PATENT OFFICE.

ADOLPH RAUBER, OF MUNICH, GERMANY.

BAKE-OVEN.

SPECIFICATION forming part of Letters Patent No. 578,833, dated March 16, 1897.

Application filed March 18, 1896. Serial No. 583,838. (No model.)

*To all whom it may concern:*

Be it known that I, ADOLPH RAUBER, a subject of the King of Bavaria, residing in Munich, in the Kingdom of Bavaria, Germany, have made certain new and useful Improvements in Baking-Ovens, of which the following is a specification.

The present invention relates to an improved form of construction of a baker's oven for the continuous baking of small wheat-bread. Its object is to simplify the construction and economize in the consumption of fuel, while the entire power of the oven is utilized, baking an entire batch uniformly and quickly.

All baking-ovens known hitherto are not adapted for baking rolls or small wheat-bread because the baking is not uniform, and the product therefore cannot all be used. The reason is that no means were known to distribute evenly the baking heat over the entire oven and to produce a uniform baking temperature through all its parts which would insure a simultaneous uniform baking of the entire batch. Besides small wheat-bread cannot be baked upon iron plates, because they easily burn, but must be placed upon chamotte plates. Yet these plates require a considerable ground heat, which it was impossible to produce in the present ovens and which could not be made effective enough against the under part of the chamotte plate. All these defects I have aimed to remedy by the present invention.

Figure 1:
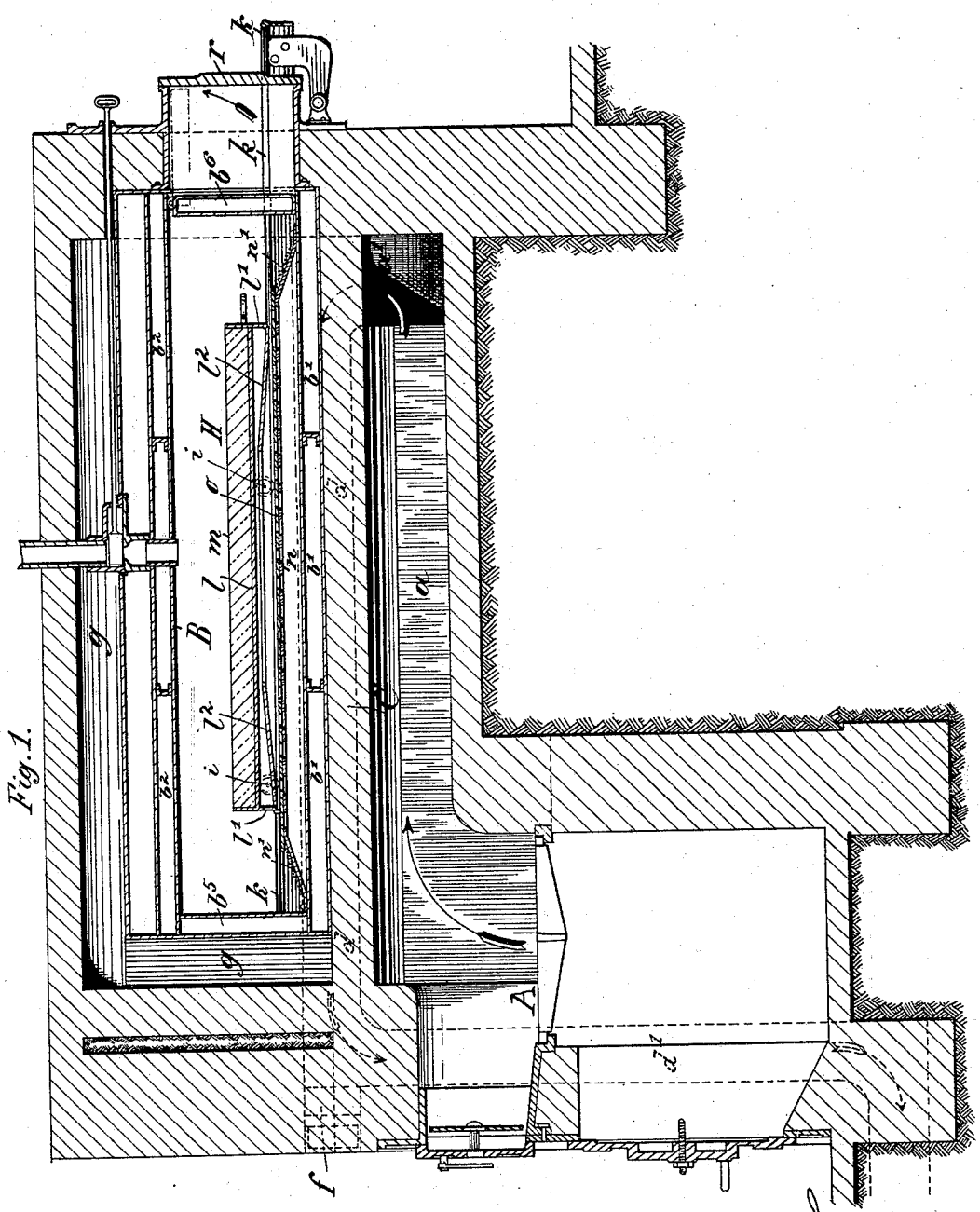
Figure 2:
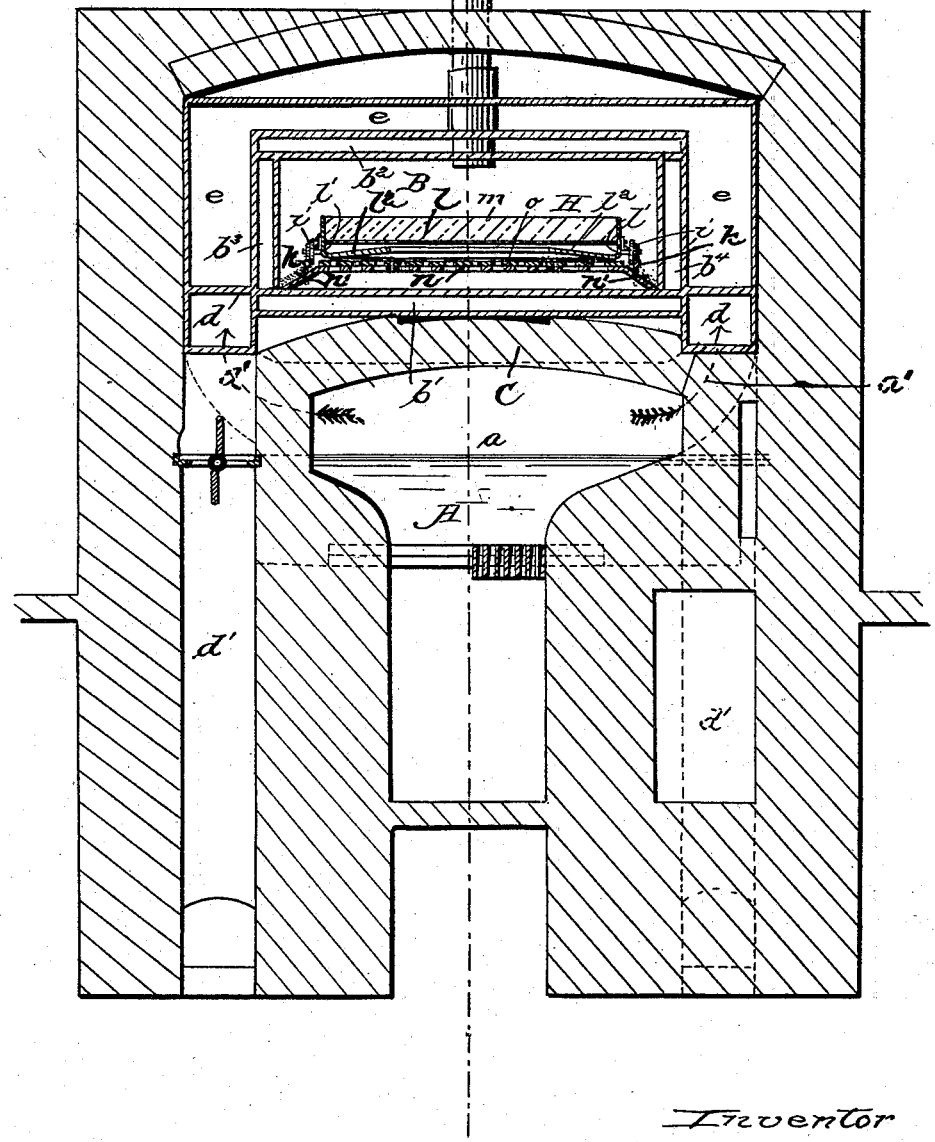
Figure 3:
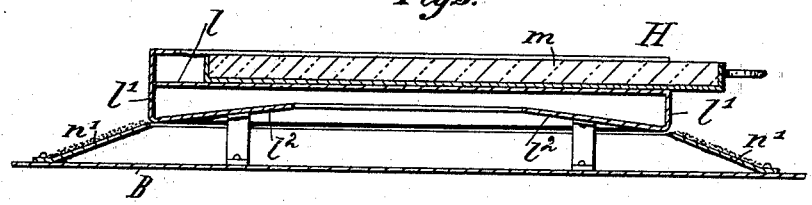
Figure 4:
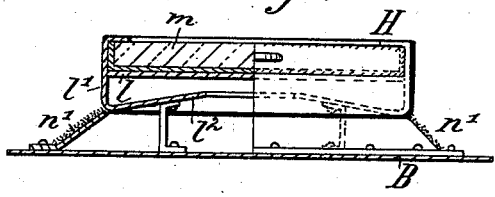
Figure 5:
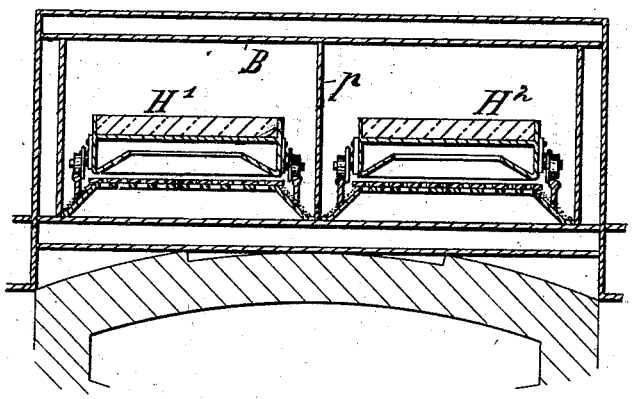

In the accompanying drawings, Figure 1 is a longitudinal section, and Fig. 2 a cross-section, of the oven. Figs. 3, 4, and 5 show modified constructions, and Figs. 6, 7, and 8 details thereof.

A is the fireplace. A horizontal smoke-pipe $a$, leading under the baking-chamber of the oven, is connected with the same. This smoke-pipe is covered by a vault C, of fire-proof stones. This vault is made to glow by the fire-gases, which pass through the pipe $a$ and constitute thereby a constant source of heat under the baking-room, while its heat is communicated uniformly over the entire length to the iron baking-box B. The baking-box B is surrounded on all sides by jackets $b'$ $b^2$ $b^3$ $b^4$ $b^5$ $b^6$, each of which is hermetically closed or communicates the one with the other or forms one connected jacket. They serve for retaining the heat furnished by the vault C and to distribute the same uniformly over the entire baking-room B, while the temperature tends to become even in all parts of these jackets. The front jacket $b^6$ can be arranged so as to permit access to the inside of the baking-room, as shown in dotted line, Fig. 1.

In order to convey sufficient heat to the upper part of the baking-room B, two iron pipes $d$ of suitable size (square or round) are placed along the lower sides of the same, which are connected at the other extremity of the oven with the pipe $a$ by means of branched-off side pipes $a'$. Hence they lead horizontally to the rear end of the oven, where they connect with eduction-pipes $d'$, leading into the flue. These two tubes $d$ serve as internal flues and are made glowing by the flames passing through them, so that they radiate a great heat over their entire length, which circulates in a space $e$, leading to the sides and over the baking-room, after which it is stored in the upper part of the same over the baking-room B and is distributed evenly, as a source of heat for the upper part of said baking-room B, through the intermediate jacket $b^2$. In order to be able to clean the flues $d$, two purging-openings $f$, Fig. 1, are provided in the prolongation of the same in the rear wall of the oven. $g$ is another jacket which surrounds the baking-room, or rather the jackets surrounding the same at the rear and above, and serves for uniformly distributing the heat, which might be somewhat greater at the back part of the oven, over the front part of the same.

During their passage through the pipe $a$ and the flue $d$ the fire-gases are compelled to communicate their heat as fully as possible to the vault C and to the jacket $e$. The increased heat enables the baking to be done quicker than hitherto, while the arrangement of the jackets around the baking-room causes a uniform distribution of said heat and thus a uniform and thorough baking of the entire batch simultaneously.

H is the adjustable baking-plate in the baking-room B. It is provided with wheels $i$ and runs over rails $k$. The same consists of a horizontal plate $l$, upon which the chamotte plate $m$ is supported, of the side walls $l'$, reaching downward from the plate $l$, and of the oblique sheet-metal plates $l^2$, connected with the lower end of the latter. A hollow space is thus formed under the plate, which is open in the middle, but closed at the sides. The rising ground heat penetrates directly against the middle of the baking-plate through the central opening and tends to divide toward the sides thereof and cannot escape on account of the sides of the hollow space being closed. In such a manner the heat radiated by the vault C exercises its effect upon the entire lower part of the surface of the hearth directly and continuously and produces an energetic, constant, and uniform heating of the chamotte plate unknown hitherto.

Immediately underneath the movable hearth-plate two horizontal superposed sheet-metal plates $n$ $o$, slitted or perforated, are arranged, the lower of which is stationary, while the upper is adjustable. Sheet-metal plates $n'$, fitted with asbestos, running down obliquely at the front and rear, as well as at the sides of the baking-place B, are connected with the stationary plate $n$. They convey the rising ground heat under the hearth-plate and prevent the same from escaping upward along the sides thereof. The heat can then only flow upward through the openings of the plates $n$ and $o$ when the hearth-plate is in the oven, as the openings of the plate $n$ are then only superposed upon the openings of the plate $o$. When the hearth-plate is pulled out, the upper movable plate $o$ closes the openings in the lower plate $n$ automatically, for instance by means of a spring or the like, and the ground heat will thereby be retained in the space underneath the sheet-metal plates $n$ $o$. When the hearth-plate is run in again, the plate $o$ will be moved again automatically by the same in such a manner that the perforations in the plate $n$ are free again, so that the stored heat can at once warm the said hearth-plate.

In order to expose as few parts as possible of the baking-hearth to the cooling-off air when drawn out, I provide the arrangement of Figs. 3 and 4. Here the frame $l$ $l'$ $l^2$ of the hearth-plate is fixed into the frame of the oven, and only the chamotte hearth-plate $m$ can be drawn out. The slitted plates $n$ $o$ can be omitted, leaving only the oblique sheet-metal plates $n'$, which convey the ground heat under the hearth-frame $l$ $l'$ $l^2$ and into the jacket thereof under the chamotte hearth-plate.

Fig. 5 shows a form of construction of the oven in which the baking-place B is divided in two baking-rooms by a longitudinal partition $p$, in each of which baking-rooms there is a correspondingly smaller baking-hearth H' and H². This arrangement has the advantage that both hearths can be used alternately and that the work can be continuous.

Figure 6:
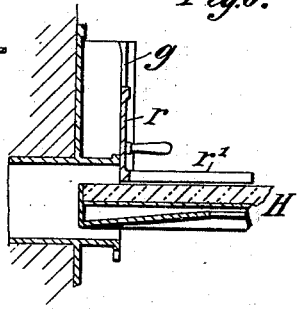
Figure 7:
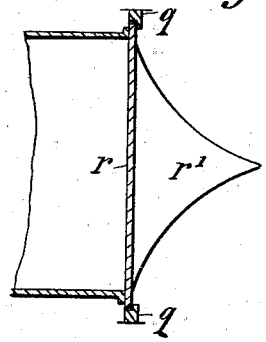
Figure 8:
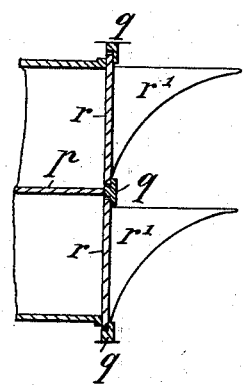

In order that the batch when baked may be removed automatically from the baking-hearth, I provide the lower end of locking-door $r$ (movable up and down in vertical guidings $q$) with triangular plates $r'$, Figs. 6, 7, and 8, cast thereon or connected therewith, having one or both of their lateral surfaces bent concave. After the hearth-plate H has been pulled out and the bread observed the locking-door $r$ is let down so far, before pushing the hearth in, that the plate $r'$ almost rests upon the surface of the hearth-plate. (See Fig. 6.) When the hearth-plate is then pushed in slowly again, the concave lateral surfaces of the plate $r'$ will remove sidewise the baked rolls or bread, which will then fall into the basket put there for that purpose.

When the baking-oven is constructed as in Figs. 1 and 2 with one single baking-place B, the plate $r'$ must preferably be formed, as shown in Fig. 7, with two concave lateral surfaces, so that the hearth-plate is emptied at each side. When the baking-place is divided, as shown in the construction of Fig. 5, it is better to give to the plates $r'$ of the locking-doors the shape shown in Fig. 8, with only one concave side, so that the emptying of the hearth-plate occurs at one side only.

I claim—

1. A baking-oven for continuous baking, comprising a longitudinal conduit $a$, a fireproof vault covering the conduit and made red-hot by the fire-gases passing through the conduit, serving as a constant source of strong ground heat for the baking-space located above the same; and side pipes leading from the flue $a$, substantially as described.

2. A baking-oven comprising a fireplace A, the conduit $a$, the fireproof vault C, the pipe $d$ and a jacketed baking-room B, substantially as described.

3. A baking-oven comprising a baking-room B, air-spaces surrounding the same, side pipes $d$ and spaces $e$ running along the longitudinal sides and over the baking-room B in which the heat radiated by the pipes $d$ rises and is stored over the same in order to produce sufficient heat for the top part thereof and an exterior jacket $g$ surrounding the baking-room, substantially as described.

4. In combination in a baking-oven, a baking-room and a movable baking-hearth H comprising a hearth-plate and a hearth-frame made of plates inclosing a hollow space open in the center below the hearth and closed at the sides, to let the ground heat reach the middle of the hearth-plate.

5. In a baking-oven, the combination of the fireplace A, the conduit $a$, the fireproof vault C and pipes $d$ with a baking-room divided in two by a longitudinal partition $p$ and a removable baking-hearth plate in each division, substantially as described.

6. In combination in an oven, a baking-room, a hearth-plate and a hearth-frame having an open center below the hearth-plate with inclosing side walls, substantially as described.

7. In combination in an oven, the baking-chamber, the hearth-plate, the hearth-frame having inclined plates open in the center, and the inclined plates $n'$ with the perforated slides, substantially as described.

8. In combination in an oven, a baking-chamber, a movable hearth and a door movable to and from the upper surface of the hearth when the same is drawn out, said door when lowered being adapted to clear the hearth-plate of the baked material, substantially as described.

9. In combination in a baking-oven, the baking-chamber, a movable hearth-plate and a door movable to and from the upper surface of the hearth-plate, said door having a plate with an inclined edge to clear the hearth-plate of the baked material, substantially as described.

In witness whereof I have hereunto signed my name in the presence of two subscribing witnesses.

ADOLPH RAUBER.

Witnesses:
   GEORG HORNUNG,
   EMIL HENZEL.